No. 851,419. PATENTED APR. 23, 1907.
H. HESS.
BALL BEARING.
APPLICATION FILED JUNE 15, 1905.

Witnesses
D. M. Smith
S. T. Washington

Inventor
Henry Hess
by Fenelon B. Brock
Attorney

UNITED STATES PATENT OFFICE.

HENRY HESS, OF PHILADELPHIA, PENNSYLVANIA.

BALL-BEARING.

No. 851,419. Specification of Letters Patent. Patented April 23, 1907.

Application filed June 15, 1905. Serial No. 265,386.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings.

It more particularly relates to ball bearings mounted in pairs, and to means for mounting such bearings in working position.

Figure 1:
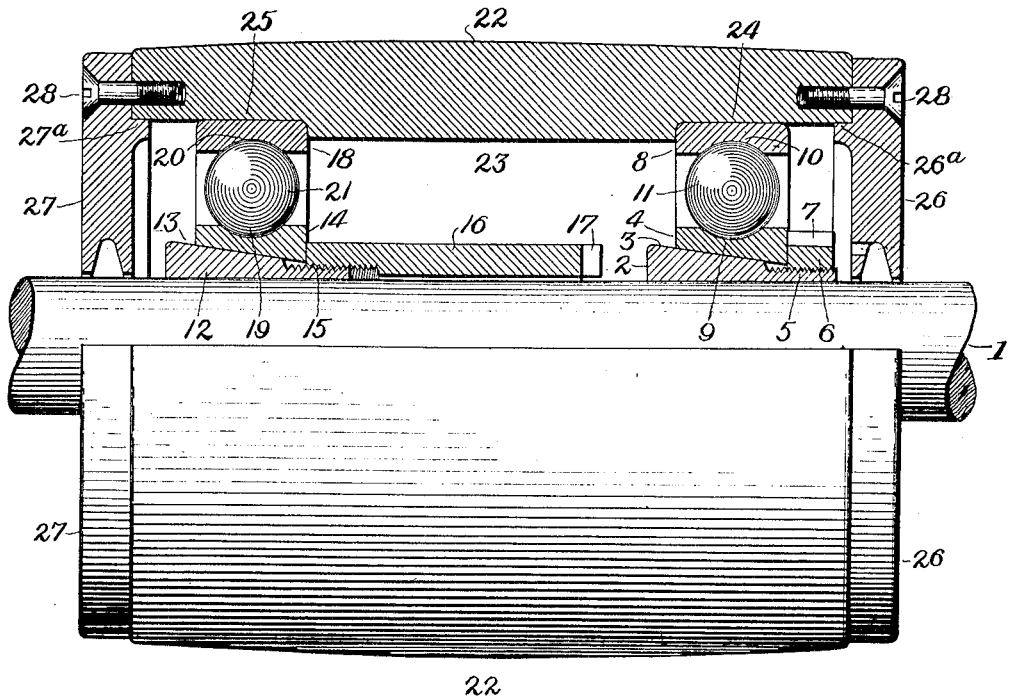
Figure 2:
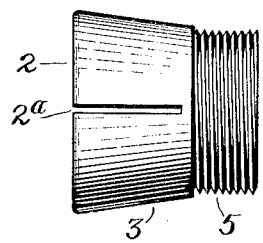
Figure 3:
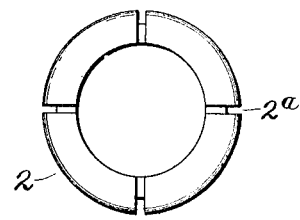

The features of novelty and advantages of my invention will be fully pointed out in connection with the accompanying drawings, illustrating an exemplifying structure embodying my said invention, in which:

Figure 1 is a side elevation of my invention as applied to a loose pulley, the upper half being in section; Fig. 2 is a side view of my split coned sleeve or "adapter;" and Fig. 3 is an end view of the same.

I have shown my invention as applied to a loose pulley; but it may be applied to any use in which the outer and inner bearing rings of the respective ball bearings are mounted on elements which have relative motion.

Referring to the drawings, 1 designates a shaft; 2, an adapter, having a cylindrical bore encircling the shaft, slits $2^a$, and a conical surface 3; 4, an inner bearing ring, having a conical bore engaging the surface 3 of adapter 2; 5, a male screw thread on adapter 2; 6, a nut having a female thread engaging thread 5; 7, notches in said nut, adapted for the use of a spanner, or other tool for setting up the nut. Or, an ordinary nut may be used, to which an ordinary wrench may be applied; 8, an outer bearing ring; 9, a ball race carried by ring 4; 10, a ball race carried by ring 8; 11, a series of balls interposed between the bearing rings 4, 8, and running in races 9, 10.

The parts described constitute a complete ball bearing, with means for securing the inner bearing ring to the shaft. The bearing proper, consisting of the rings 4 and 8, the ball races, and the balls, may be assembled in any suitable manner as a complete unit.

Numerals 12 to 21, inclusive, designate parts of another complete bearing and adapter, similar respectively to parts above described numbered 2 to 11, inclusive, except that the nut 16 is lengthened (for a purpose to be hereafter described) and provided with notches 17 in the end, to be engaged by a spanner. Or the nut 16 may be adapted to an ordinary wrench, if desired.

22 is a pulley rim; 23, the bore of said rim; 24, an annular pocket in the rim 22 accommodating bearing ring 8; 25, a similar pocket for bearing ring 18; 26 and 27, end plates, one for either end of the pulley, serving to retain oil and exclude dirt, and having beads $26^a$, $27^a$ respectively, engaging the inner circumference of the pulley rim, for centering said plates; 28, screws or the like for securing the plates to the pulley rim.

Supposing the pulley to be disassembled, it may be assembled by placing the bearing B in position in the pulley rim, with the bearing ring 18 in the pocket 25. The adapter 12 is then inserted in the inner ring 14, and the nut 16 may be screwed a short distance onto the thread 15 of the adapter. The end plate 27 may then be secured to the pulley rim by screws 28. The shaft 1 is then passed through the bore of the adpater 12 until said shaft is in the desired position with relation to the pulley, and is then secured by setting up the nut 16, which may be easily reached from the right-hand end of the pulley. The setting up of the nut draws the conical adapter to the right with relation to the inner bearing ring 14, thereby compressing the adapter on the shaft and making a very tight connection. The bearing A may then be similarly put in place from the right-hand end of the pulley and locked in position on the shaft in a similar manner, after which the end plate 26 may be secured to the pulley rim, completing the assembly of the pulley.

When the pulley has been assembled as described, it may be removed from its shaft by simply removing the plate 26, loosening the nut 7, driving the adapter to the left until it loosens, and withdrawing the whole bearing A from the pulley. The nut 16 may then be reached, and the adapter 12 similarly released, whereupon the whole pulley may be removed from the shaft, or adjusted to a new position.

Many other adaptations of the principles of construction and assembly shown will be readily apparent to persons versed in the art. The application of the invention shown is merely an exemplification.

In lieu of the adapters described, which have a conical exterior surface fitting a corresponding bore in the inner bearing ring, the adapter may co-act with another, having a conical bore, and a cylindrical outer surface, fitting a cylindrical bore in the inner bearing ring.

I am aware that many features of my invention may be applied to bearings wherein rollers of cylindrical, conical or other forms, are substituted for balls, and I contemplate the use of such anti-friction members instead of spherical balls wherever it is desirable.

I claim

1. The combination of a shaft, an annular casing revoluble relative to said shaft, a plurality of unit-assembled bearings in said casing, and means for securing said bearings in position from the same end of said casing.

2. The combination of a shaft, an annular casing, a plurality of complete ball bearings in said casing, an adapter for securing a member of each bearing to said shaft, and an elongated nut engaging one of said adapters and extending towards one end of said casing.

3. The combination of a shaft, a revoluble member, two independent bearings intermediate said shaft and said revoluble member, and means for securing a member of each bearing to said shaft from the same end of said revoluble member.

4. The combination of a shaft, a casing of hollow, generally-cylindrical form, having a shoulder near each end forming a seat for a bearing member which may be slipped into position from the adjacent end of the casing; a closure for each end of the casing, one of which is removably secured thereto; a complete assembled ball bearing near one end of said casing, having one of its bearing rings seated against one of said shoulders, and having an internal conical bore in its inner bearing ring; a conical adapter on the shaft engaging the said conical bore and having a screw-threaded extension; a long nut surrounding the shaft, having an internal thread engaging the thread on the adapter, and acting when screwed up, by contact with the inner bearing ring to draw the two conical members together, thereby securing the inner bearing ring to the shaft, the said nut extending toward the opposite end of the casing and being there provided with means for turning it by a suitable tool; and another similar complete ball bearing similarly secured to the other end of the casing by means of an adapter and a short nut; the whole construction being such that the bearing first mentioned may first be secured in position in its proper end of the casing from the further end of the casing, and the other bearing then placed from the same end and secured in position as above described.

5. The combination of a shaft, a hollow casing having a shoulder near each end, a closure for each end of the casing, one of which is removable, a complete assembled ball-bearing having one of its bearing rings seated against one of said shoulders in one end of the casing, a conical adapter on the shaft engaging the bore of the other ring of said bearing and having a threaded extension, a nut engaging the thread on the adapter and extending toward the other end of the casing and serving when set up to secure said bearing ring to the shaft, and another complete ball-bearing similarly secured on the other end of the casing by means of an adapter and a short nut; the construction specified serving to permit the two bearings to be secured in position in the casing from the same end thereof.

In testimony whereof I have affixed my signature in the presence of two witnesses.

HENRY HESS.

Witnesses:
THEO. H. M'CALLA,
NETTIE L. HAHN.